United States Patent [19]
Goodwin

[11] Patent Number: 6,008,661
[45] Date of Patent: Dec. 28, 1999

[54] FIELD STRENGTH GAP TESTER

[75] Inventor: Shaun Goodwin, Hurlock, Md.

[73] Assignee: Airpax Corporation, LLC, Frederick, Md.

[21] Appl. No.: 08/990,873

[22] Filed: Dec. 15, 1997

[51] Int. Cl.[6] .................................................. G01R 27/26
[52] U.S. Cl. ........................ 324/662; 324/671; 324/423; 324/661
[58] Field of Search ............................. 340/644; 324/662, 324/671

[56] References Cited

U.S. PATENT DOCUMENTS

| | | | |
|---|---|---|---|
| 3,387,776 | 6/1968 | Stillwell | 324/662 |
| 3,502,969 | 3/1970 | Courtney | 324/662 |
| 3,506,911 | 4/1970 | Stone | 324/421 |
| 5,027,075 | 6/1991 | Harding | 324/662 |

Primary Examiner—Josie Ballato
Assistant Examiner—Jose M. Solis
Attorney, Agent, or Firm—Milde, Hoffberg & Macklin, LLP

[57] ABSTRACT

A system for detecting a gap of unknown width, the system having an RF signal generator having an output interface that outputs an RF signal and that interfaces with an input portion of a test device that is electromagnetically connected with a first surface of a gap. The system also comprises an RF signal receiver having an input interface that receives an RF signal and that interfaces with an output portion of the test device that is electromagnetically connected with a second surface of a gap. The RF signal receiver generates an electrical output to an output interface when an RF signal is detected. A processor has an input interface that interfaces with the output interface of the RF signal receiver and the processor converts the electrical signal from the receiver into an indication to the user of the presence of a gap in the test device.

6 Claims, 11 Drawing Sheets

FIELD STRENGTH GAP TESTER

BACKGROUND AND SUMMARY OF THE INVENTION

This invention is directed to systems and devices for measuring or detecting small gaps between metal objects.

Various devices and techniques for detecting or measuring small gaps between objects, such as metal contacts in a switch, are known. For example, the well-known micrometer is such a device for measuring small but visible distances between objects. Another example of a known device is the dielectric tester. Use of this type of tester is effective for determining the presence of gaps that are not visible, but typically destroys the article being tested. The dielectric tester can only determine whether or not a gap is sufficient for a particular purpose, but cannot determine the width of the gap.

Thus, neither the known micrometer nor the known dielectric tester can measure gaps that are not visible without destroying the article being tested.

The present invention includes a system and method for measuring and/or detecting gaps or distances that are non-visible (defined as either enclosed or otherwise obscured, or too small to be seen by the naked eye) and making such measurements without destroying the article being tested.

The present invention comprises a system having an RF signal generator having an output interface that outputs an RF signal and that interfaces with an input portion of a test device that is electrically connected with a first surface of a gap. The system also comprises an RF signal receiver having an input interface that receives an RF signal and that interfaces with an output portion of the test device that is electrically connected with a second surface of the gap. The RF signal receiver generates an electrical output to an output interface when an RF signal is detected. A processor has an input interface that interfaces with the output interface of the RF signal receiver and the processor converts the electrical signal from the receiver into an indication to the user of the presence of the gap in the test device.

Thus, according to the present invention, an RF signal is applied to one side of a suspected gap in a test object. An RF receiver is connected to the other side of the suspected gap. For example, for a metal test object, such as a switch, the signal is applied to one contact and the receiver is connected to the other.

If no gap exists, then the capacitance of the gap is a maximum, and the RF signal received by the receiver will be its strongest. (This will be referred to as the "baseline" signal for a particular test device.) On the other hand, as the gap increases in size, its capacitance decreases, and the received signal decreases in amplitude with respect to the baseline signal.

The electrical signal outputted by the receiver is proportional to the strength of the RF signal received, and thus will also decrease from a maximum (corresponding to the baseline signal) as the gap size increases. Thus, the electrical output of the receiver correlates to the width of the gap.

The electrical signal outputted by the receiver is processed using standard amplification and other digital processing devices. For example, the output of the processing may be made to detect a gap exceeding a certain threshold, which would correspond to the received RF signal dropping to an amplitude such that the electrical signal generated by the receiver fell below a threshold level, as determined by the processing.

Alternatively, two or more known gaps in the test device may be used to correlate the received RF signal to known gap widths in a test device. These calibration points may be used with the processing to generate an output of gap width for the test devices.

BRIEF DESCRIPTION OF THE DRAWINGS

For better understanding of the invention, reference is made to the following drawings which are to be taken in conjunction with the detailed description to follow.

DETAILED DESCRIPTION OF THE PREFERRED EMBODIMENT

Figure 1:
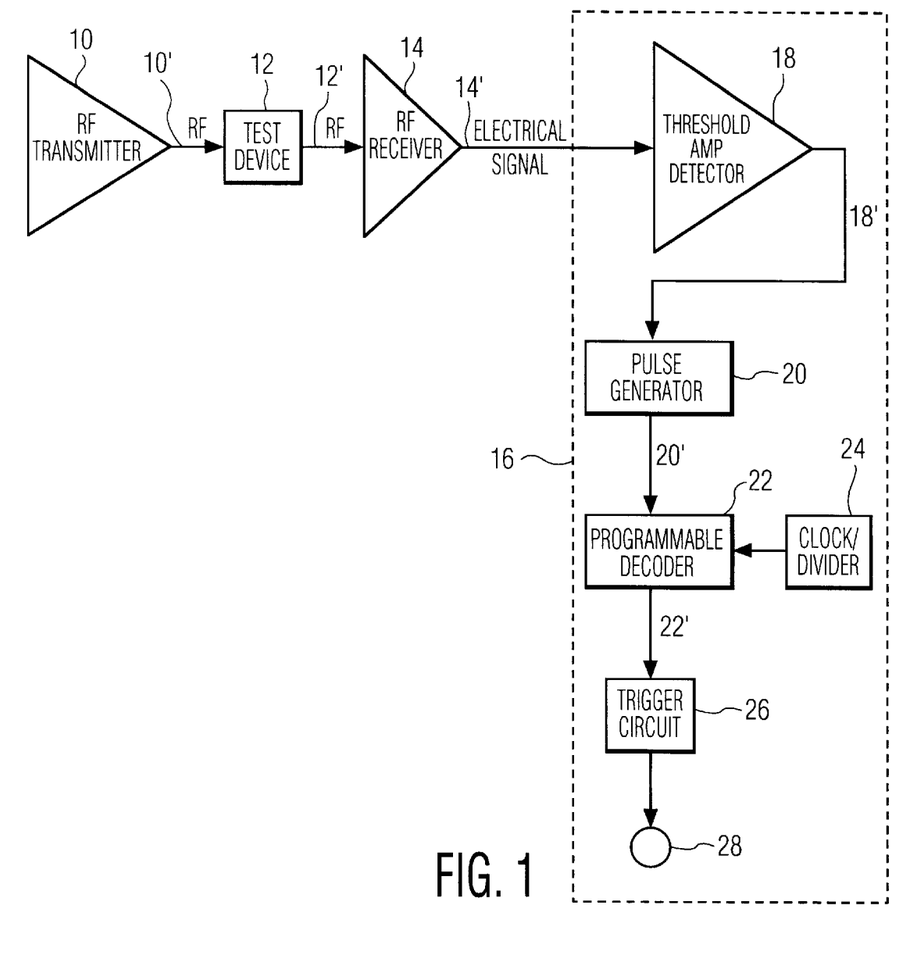
FIG. 1 is a block diagram of a system according to the present invention.

FIG. 1 gives a schematic diagram of a field strength gap tester system in accordance with the present invention. As shown in the figure, the system comprises an RF transmitter 10 and an RF receiver 14 configured to apply an RF signal to a test device 12 and detect an RF signal from the test device 12. Thus, the RF output 10' of the RF transmitter 10 is applied to the test device 12 at one side of a suspected gap. For example, if the test device 12 is a single-contact switch, the output of the RF transmitter 10 is connected using a lead to one terminal of the switch.

The input of the RF receiver 14 is connected to the output 12' of the test device 12. For the single-contact switch example, the input of the receiver 14 is connected using a lead to the opposite terminal of the switch.

Figure 2:
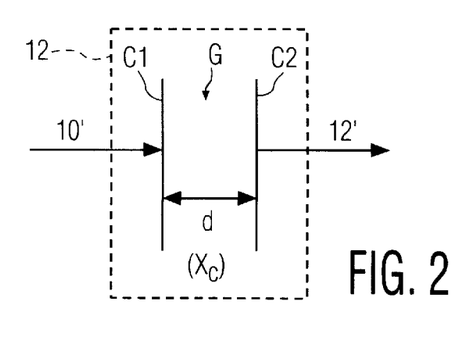
FIG. 2 is a schematic diagram of the gap of the test device of FIG. 1.
Figure 3:
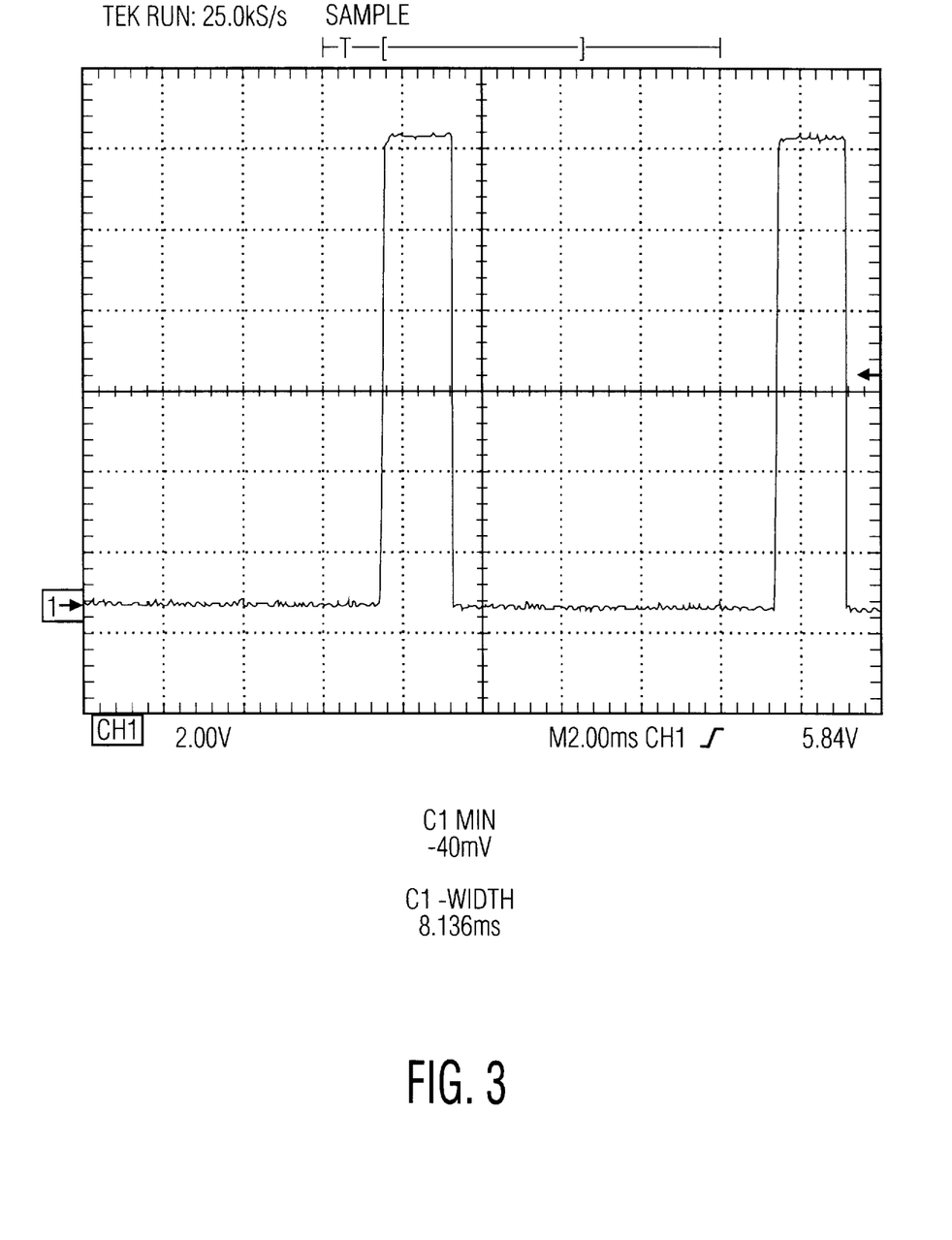
FIGS. 3–12 are experimental graphs showing pulse width of the processed RF signal for a test device having various known gap widths using a system according to the present invention.
Figure 4:
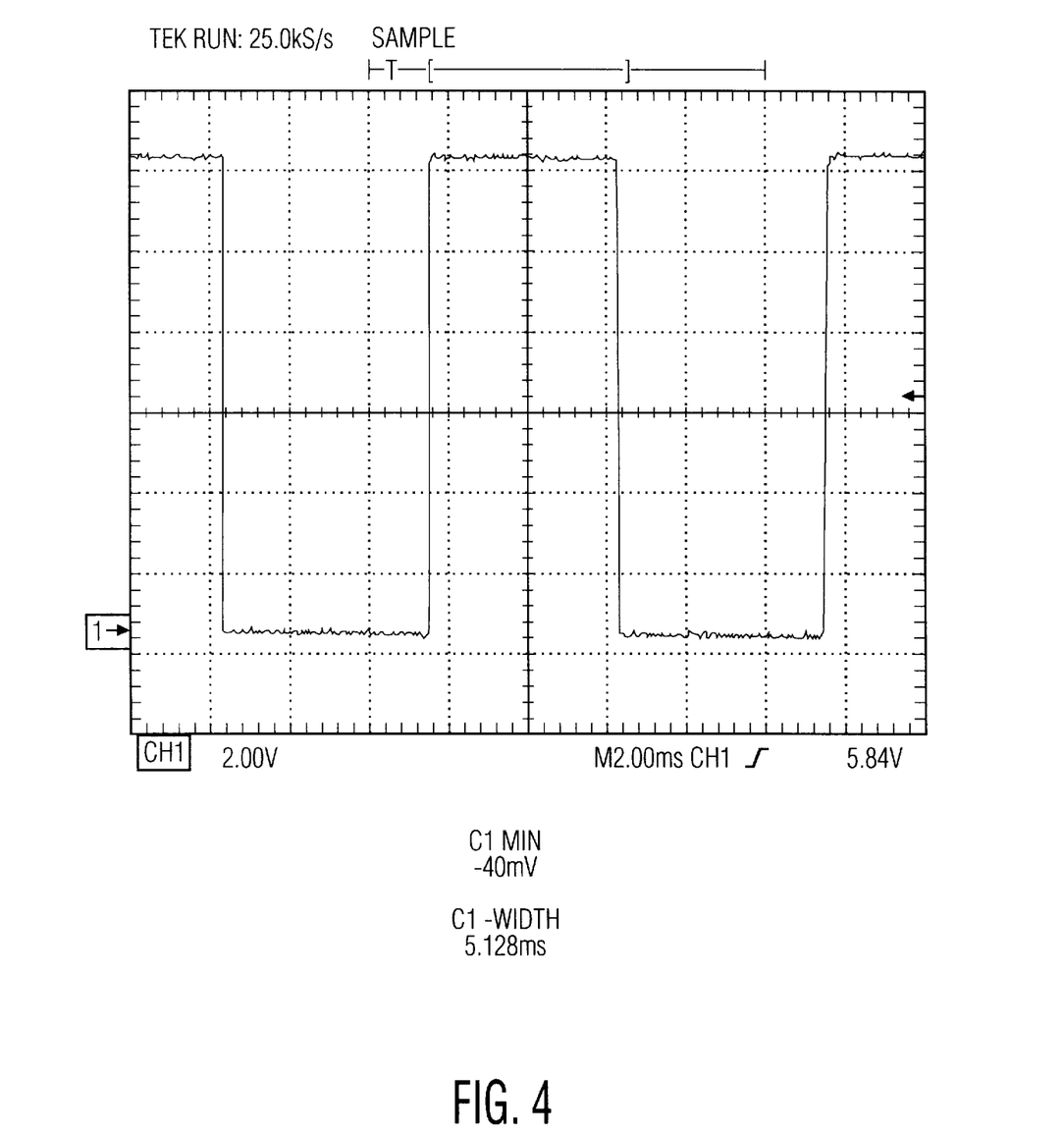
Figure 5:
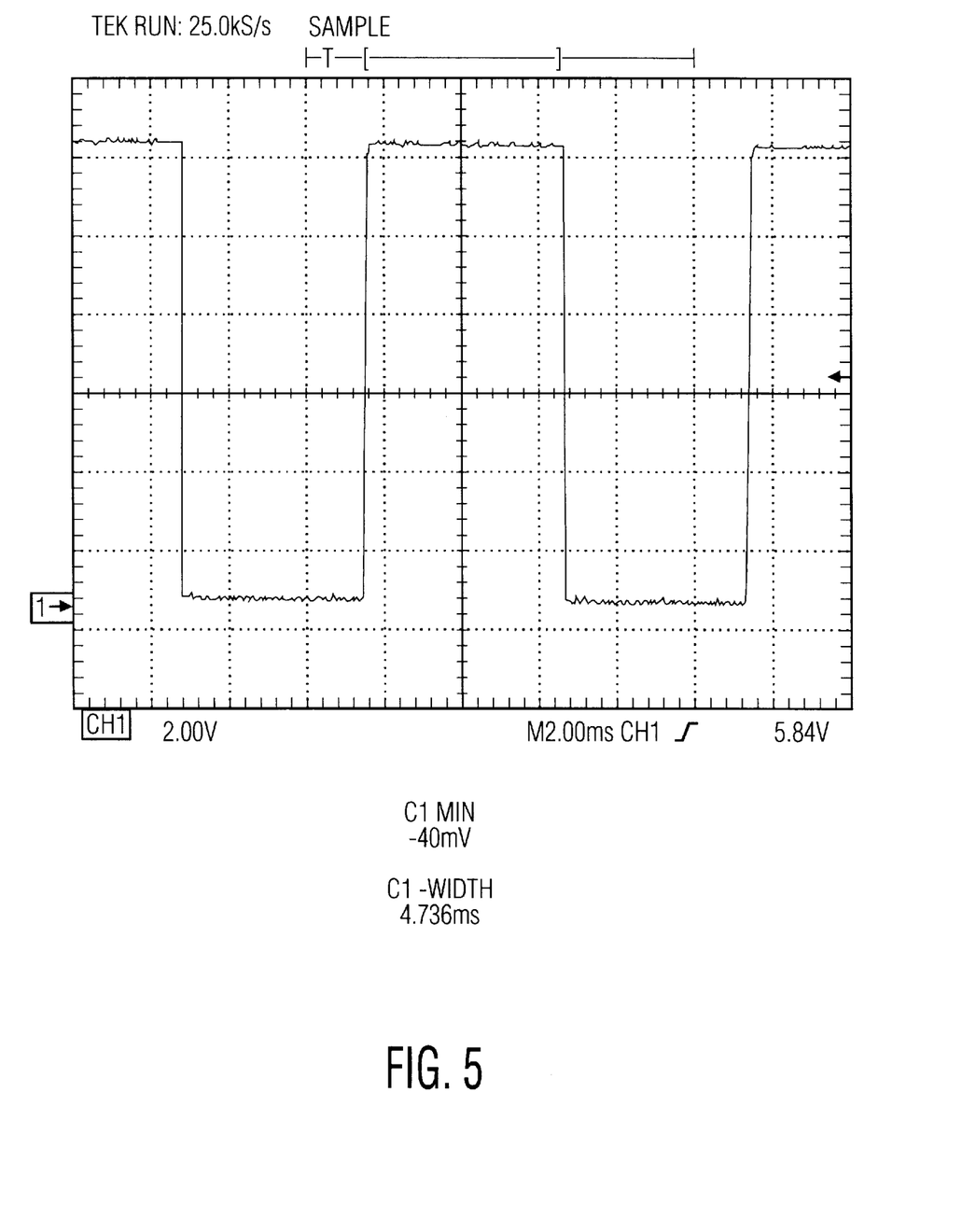
Figure 6:
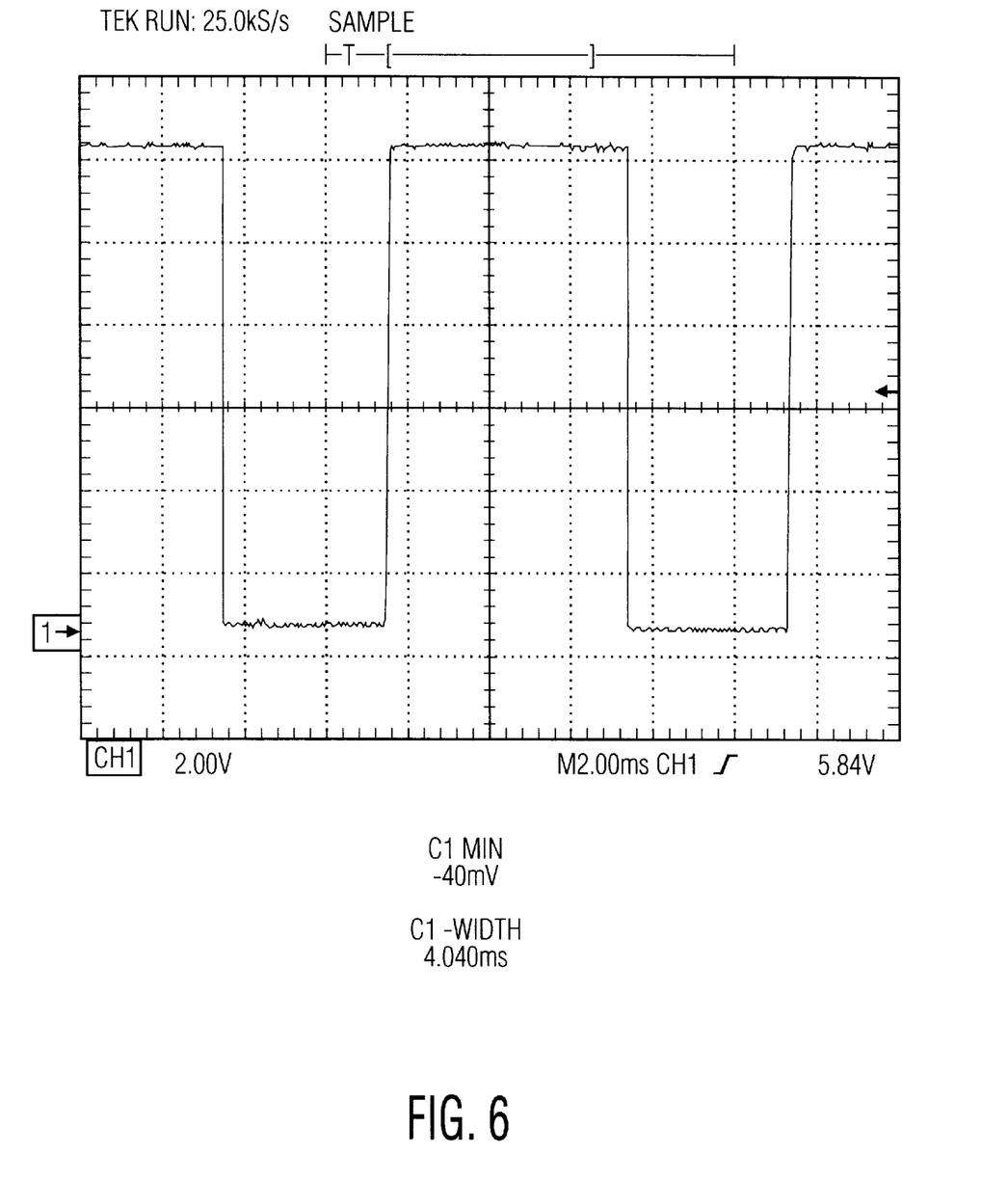
Figure 7:
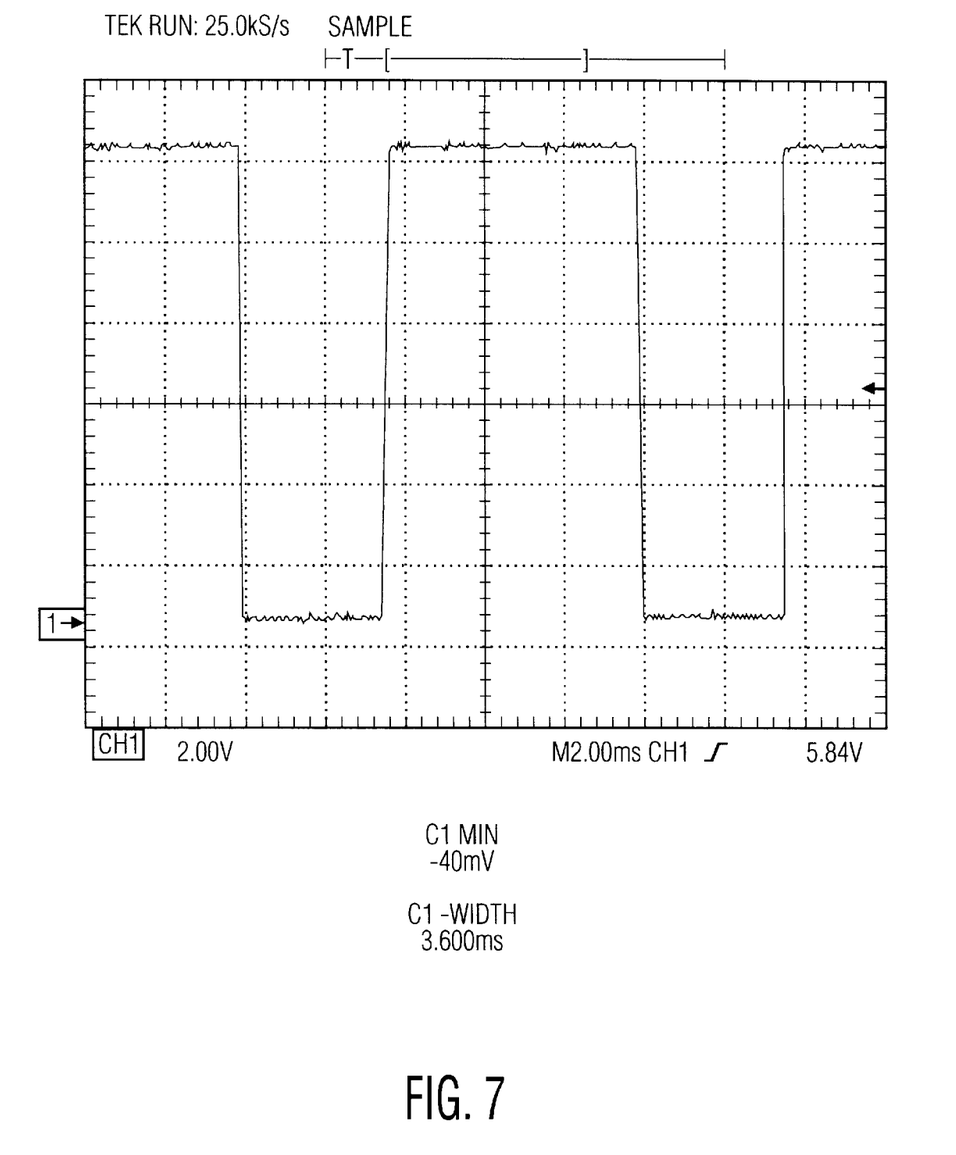
Figure 8:
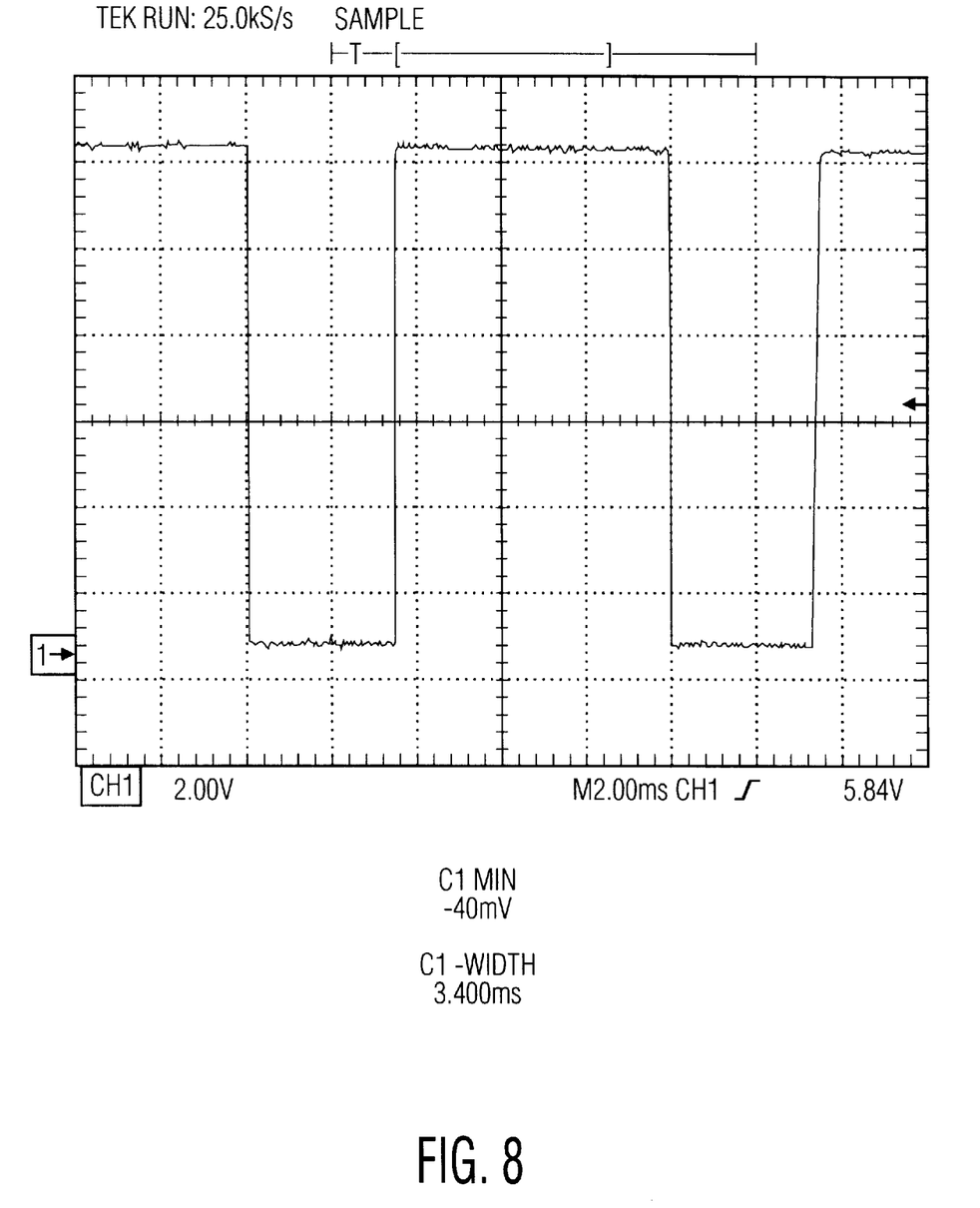
Figure 9:
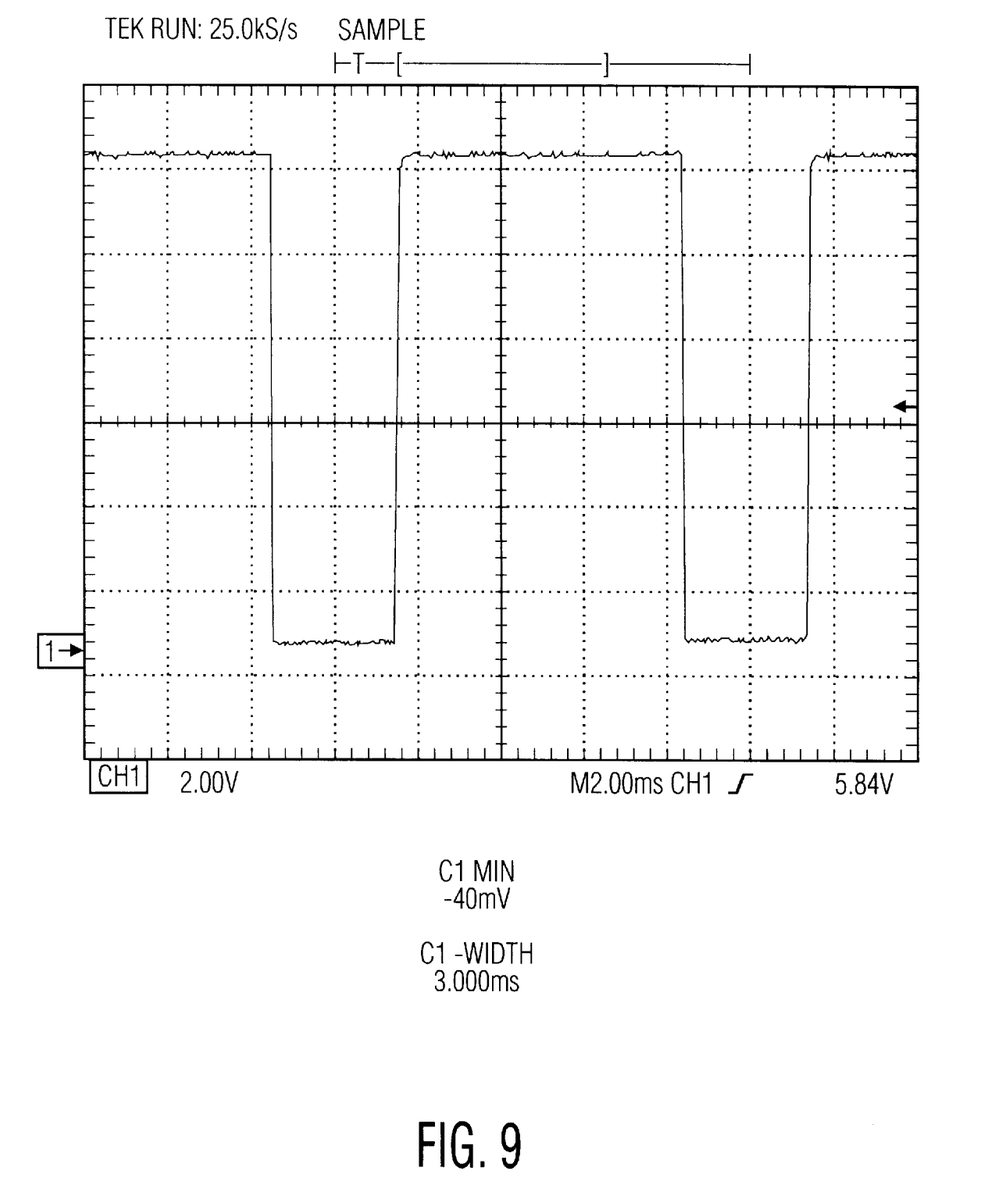
Figure 10:
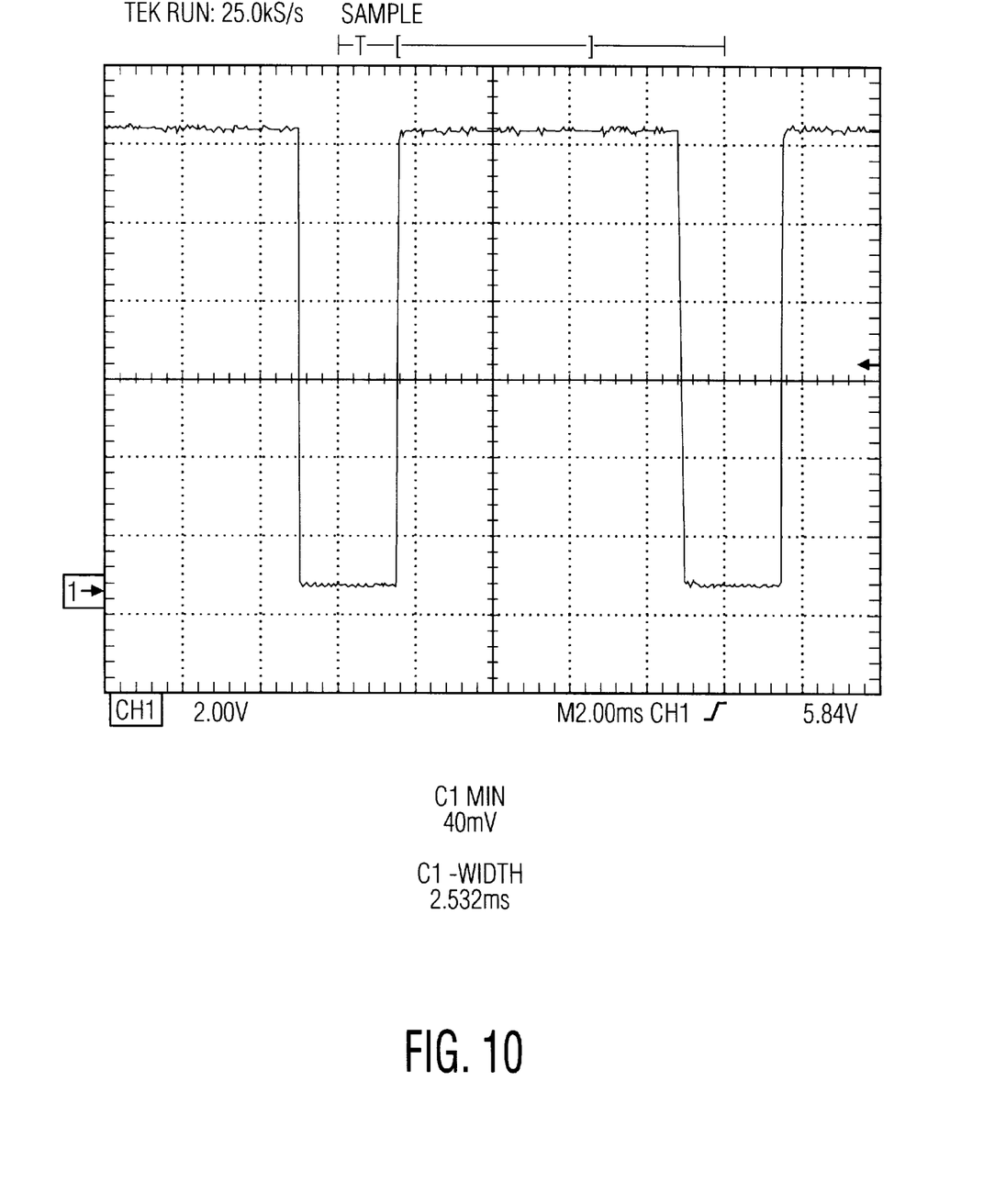
Figure 11:
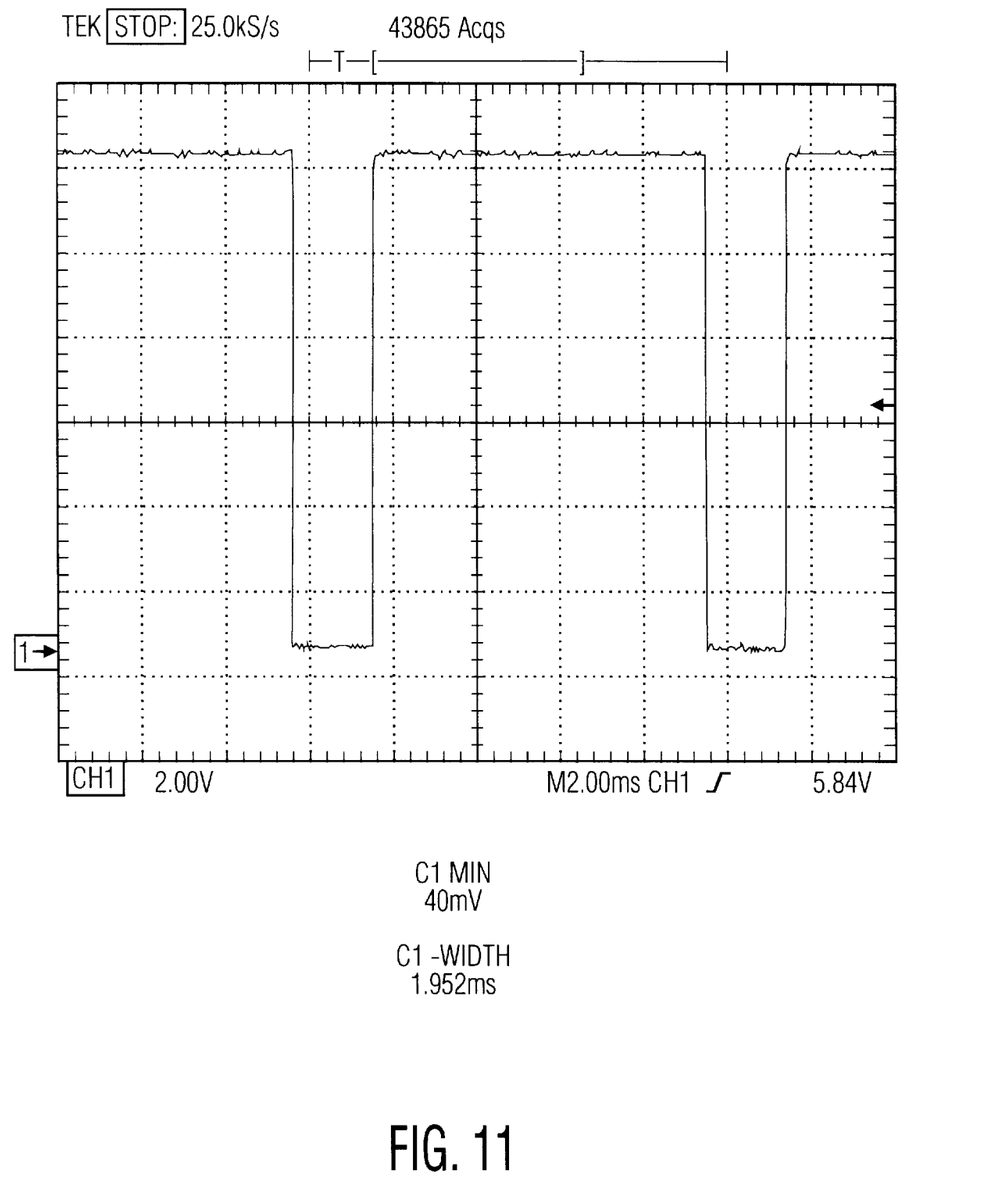
Figure 12:
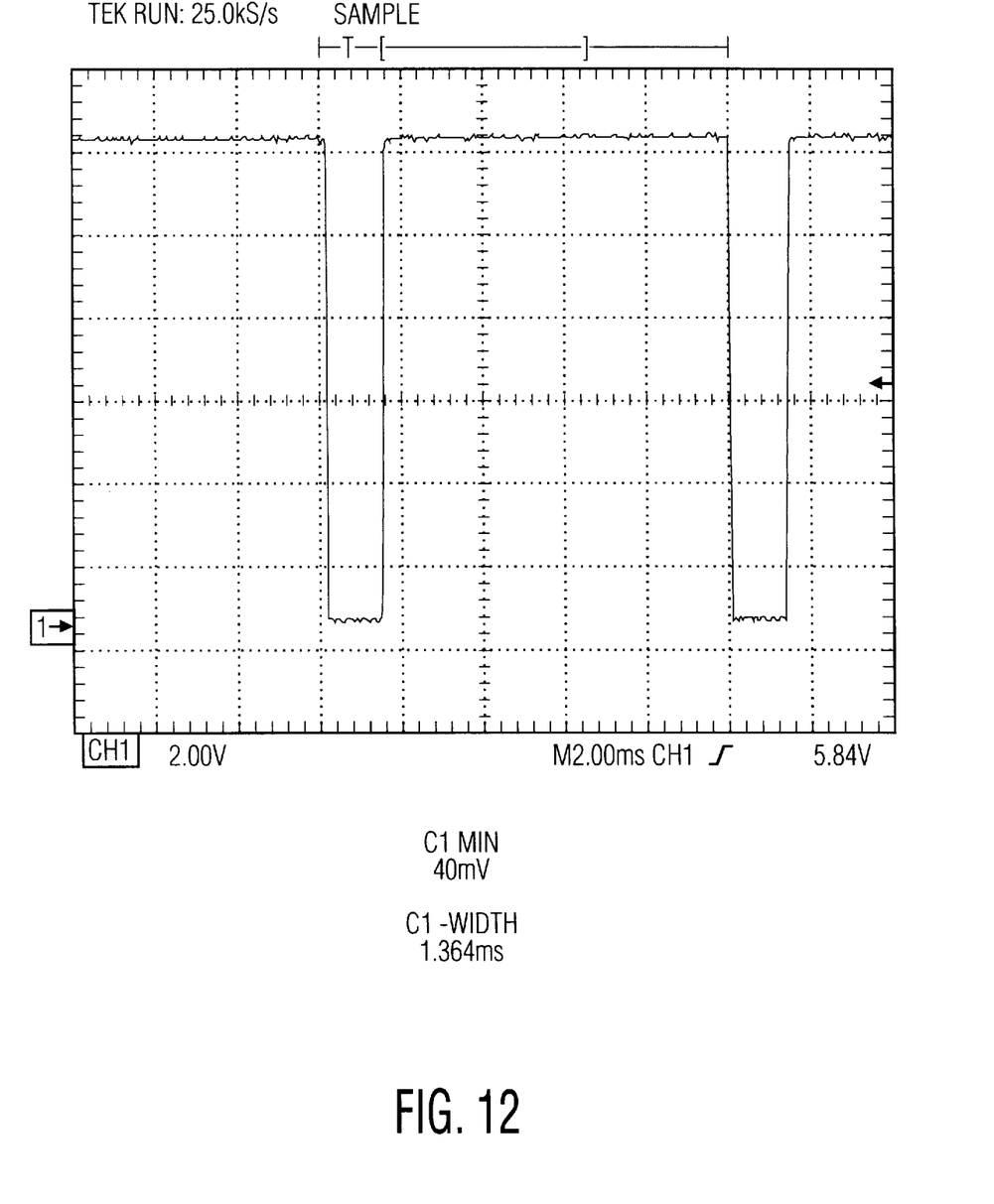

Referring to FIG. 2, the test device 12 of FIG. 1 is represented schematically as a gap G of width d. The RF signal 10' from the transmitter 10' is applied to one side (labeled C1) of the gap G. An RF signal 12' is shown being transmitted from the test device 12 at the other side (labeled C2) of the gap G. Where the test device 12 is a switch, the sides C1, C2 of the gap G are the contacts. (The test device 12, of course, is three dimensional; thus, the gap G and the contacts C1, C2 have a surface area A perpendicular to the plane of the figure.)

An RF signal 10' applied to contact C1 by the transmitter 10 will pass through the gap G, thus giving rise to RF signal 12' at the opposite side of the gap G at contact C2. (As seen in FIG. 1, RF signal 12' is equivalent to the output 12' of the test device 12 that interfaces with the RF receiver 14.) Thus, the RF signal 12' at side C2 of the gap G is conceptually the RF signal 10' applied at the side C1 of the gap G, as attenuated by the gap G. The gap G acts as a capacitor to the RF signal 10' applied to side C1. For a constant surface area A of the sides C1, C2 of the gap, the capacitance of the gap G is inversely proportional to the gap width d. The capacitance of gap G is also inversely proportional to a capacitive reactance ($X_c = (2\pi f C)^{-1}$) of the gap G.

The RF signal 10' decreases as the capacitance of gap G decreases. Thus, the RF signal 10' is also inversely proportional to d. For a gap G of zero width, i.e., no gap G, then the RF signal 10' is a maximum, and the RF signal 12' that is outputted to the receiver 14 is greatest. As the width d of the gap G increases, RF signal 12' decreases.

Thus, the strength (intensity) of the RF signal 12' received and detected by the receiver 14 is functionally related to the width d of gap G. The electrical signal 14' generated by the RF receiver 14 is determined by the strength of the RF signal 12' received. It follows that the electrical signal 14' is also functionally related to the width d. For a gap width d of zero, the electrical signal will be a certain maximum. As the gap width d increases, the electrical signal 14' generated by the receiver 14 will decrease, as a result of the attenuated RF signal 12'.

The strength of the electrical signal 14' may accordingly be correlated against known gap widths d. Once the electrical signal 14' generated by the system has been calibrated using known gap widths, the system may be applied to test devices having gaps of unknown width d, and the electrical signal 14' generated may be converted into gap width d.

Referring back to FIG. 1, the electrical signal 14' of the receiver is used as an input to processing components 16, which translate it into intelligible output for the user. The processing can, for example, be used to generate a measure of gap width from the calibrated system, as discussed above. Alternatively, the processing may signal a gap exceeding a threshold gap width, corresponding to where the signal 14' falls below a threshold amount. The particular processing components 16 depicted in FIG. 1 will be discussed below with the description of experimental results shown in FIGS. 3–12.

Experimental Results

A system such as that shown in FIG. 1 was implemented to generate the graphs that measure gap width in a test device shown in FIGS. 3–12. The system was used to test the gap width of Philips Technologies 6700 bi-metallic switches. Thus, the 6700 switches used correspond to the test device 12 depicted in FIG. 1.

The RF transmitter 10 generated an RF signal 10' with a frequency of approximately 27.125 MHz, amplitude of 2.5 V (peak to peak), and power on the order of 30 $\mu$V/m. The RF output of the RF transmitter was connected to one of the contacts of the 6700 switch.

The RF receiver 14 was a superheterodyne receiver having sensitivity from approximately 10 $\mu$V/m to 100 $\mu$V/m. As shown in FIG. 1, the input of the receiver 14 was connected to the other contact of the 6700 switch. Thus, the RF output 12' of the test device is the input of the receiver 14.

The processing components 16 used to process the electrical signal 14' output of the receiver 14 included a threshold amp detector 18. The threshold amp detector 18 measures the amplitude of the electrical signal 14' output of the receiver and outputs an amplified sinusoidal waveform 18' having a peak that is proportional to the amplitude of the electrical signal 14'. (The peak of waveform 18' may range anywhere from millivolts to volts.) The waveform output 18' by the threshold amp detector 18 is inputted to a pulse generator 20 that converts the sinusoidal waveform 18' into a digital pulse 20' having width that is proportional to the peak of the inputted waveform.

Thus, the digital pulse 20' outputted by the pulse generator 20 is proportional to the electrical signal 14' of the receiver, and is thus functionally related to the width of the gap in the switch. (As with the electrical signal 14' of the receiver 14, the digital pulse 20' will decrease as a function of increasing gap width.) With the signal in digital form, the combination of decoder 22 and clock 24 outputs a temporal pulse width 22'. Other processing (not shown) can then correlate the pulse width 22' to the gap width d based on the pre-programmed calibration points. Alternatively, a trigger circuit 26 can be used to compare the pulse width 22' to a threshold point, to alert that the gap width d has exceeded or fallen below a set width.

The above-described system was used to generate FIGS. 3–12 for various known and increasing gap widths d in the 6700 switch test device. The graphs were generated using a digital storage scope to show the digital pulse width 22' output of the decoder 22. The figures depict digital pulses having widths on the order of milliseconds.

Moving sequentially from FIG. 3 to FIG. 12, the gap width is increased from 3 mil (0.003 inches) to 12 mil (0.012 inches). The measured digital pulse output of the decoder 22 are seen to decrease from 8.136 ms to 1.364 ms. Thus, the results show that the system operates as described: The digital pulse width decreases as the width of the gap increases and vice versa, which confirms and illustrates the functional relationship between the received RF signal (14') and the gap width d. The graphs of FIGS. 3–12 also demonstrate that the RF signal 14' received may be processed to give an output of gap width to the user by calibrating the system with known gap widths. By so calibrating the system, it may then be applied to a 6700 switch to determine an unknown gap width.

(Of course, the magnitude of the digital pulse output will vary depending on the particular processing electronics used. However, for a system as described, there will be a decreasing pulse width relative to an increasing gap width, and vice versa, as shown in FIGS. 3–12. Also, once particular electronics are selected, calibration points for known gap widths may be used to correlate the digital pulse output to gap width based on known calibration points for the particular electronics.)

The above described structures and methodology are merely illustrative of the principles of the present invention. Numerous modifications and adaptations thereof will be readily apparent to those skilled in the art without departing from the spirit and scope of the present invention and the appended claims.

What is claimed is:

1. A system for evaluating a gap in a device, comprising;

an RF signal generator feeding a signal to a first surface of the gap;

an RF signal receiver with an input connected to a second surfacc of the gap; and a processor interfaced with the RF signal receiver, the processor converting the amllplitude of al received signal by a hyperbolic-to-linear transformation to a characteristic variable that varies linearly with the gap width.

2. A system as in claim 1, wherein the first and second surfaces of the gap are contacts of an electrical switch.

3. A system as in claim 1, wherein the processor is comprised of one or more digital signal processing components.

4. A system as in claim 1, further comprising display means for displaying the width of the gap.

5. A system as in claim 3, wherein the characteristic value is compared to a threshold value to decide if the gap either falls below or if the gap exceeds a predetermined distance value to produce a threshold crossing indication.

6. A system as in claim 5, further comprising notification means for notifying a user of the threshold crossing indication.

* * * * *